UNITED STATES PATENT OFFICE.

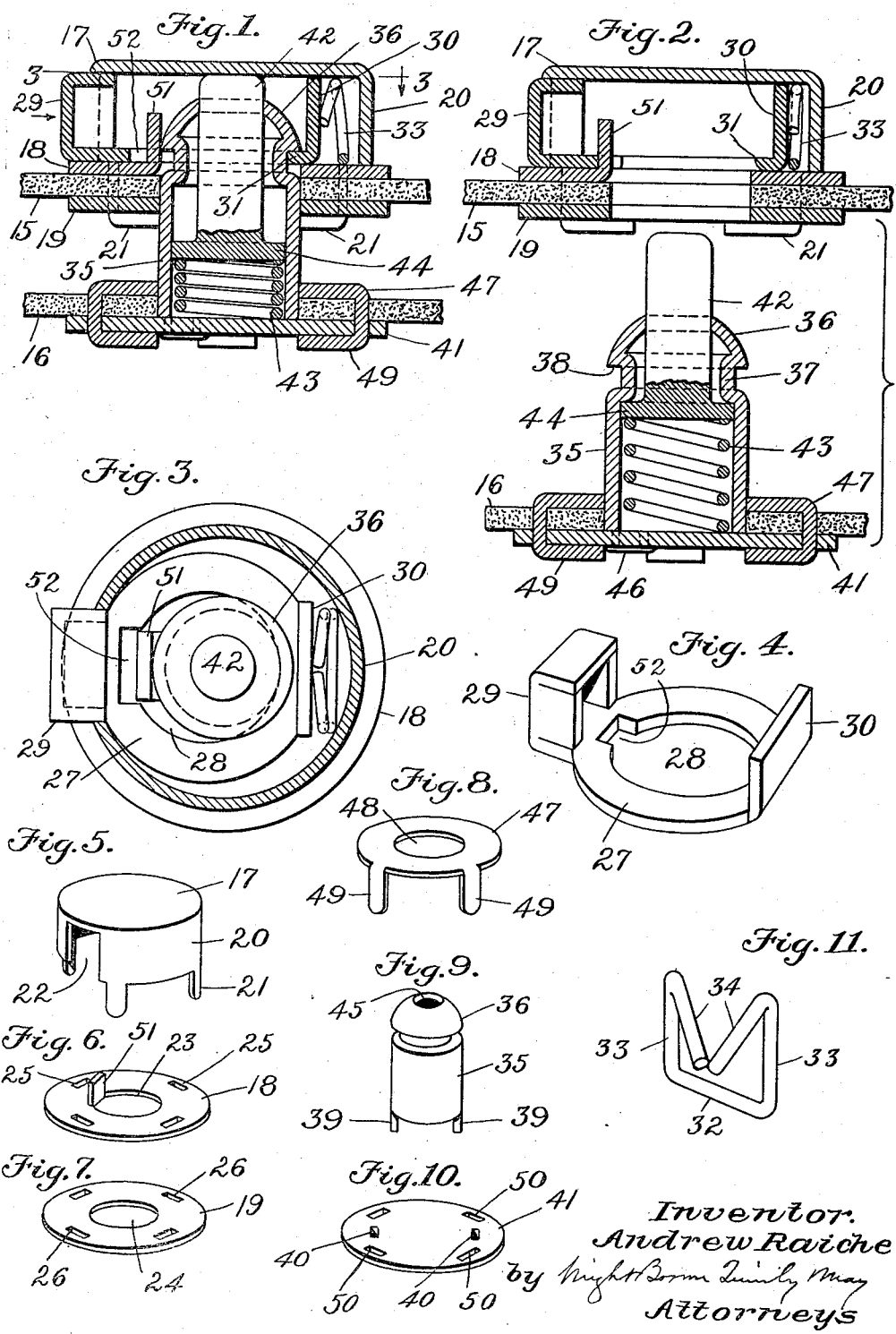

ANDREW RAICHE, OF FAIRHAVEN, MASSACHUSETTS, ASSIGNOR TO ATLAS TACK COMPANY, OF FAIRHAVEN, MASSACHUSETTS, A CORPORATION OF NEW JERSEY.

STUD-AND-SOCKET FASTENER.

1,277,258.   Specification of Letters Patent.   Patented Aug. 27, 1918.

Application filed May 3, 1917. Serial No. 166,142.

*To all whom it may concern:*

Be it known that I, ANDREW RAICHE, a citizen of the United States, residing at Fairhaven, in the county of Bristol and State of Massachusetts, have invented new and useful Improvements is Stud-and-Socket Fasteners, of which the following is a specification.

The object of the present invention is to provide an improved stud and socket fastener. The invention as shown by the accompanying drawings is embodied in a structure, most of the parts of which are capable of being made of ductile sheet metal.

A fastener embodying the present invention is particularly adapted for relatively hard usage such as fastening the flaps or folding tops of automobiles. To facilitate disconnecting the stud and socket members the former is provided with an ejector that has a spring action, and that acts against the socket member to force the two members apart when the latch member is moved to release them.

Other features of the invention are illustrated by the accompanying drawings and hereinafter described and claimed.

In the drawings:

Figure 1 represents a sectional view through a fastener embodying the present invention in what I now consider the preferred form, the two principal elements being interlocked with each other in coöperative relation.

Fig. 2 is a view similar to Fig. 1 excepting that the two principal elements are disconnected, the latch member being retracted from normal position.

Fig. 3 represents a section in the plane indicated by line 3—3 of Fig. 1.

Fig. 4 is a perspective view of the movable latch member.

Fig. 5 is a perspective view on a smaller scale of the member in which the latch member is arranged.

Figs. 6 and 7 are perspective views of plates or washers between which one of the flaps is fastened.

Fig. 8 represents a perspective view of a plate or washer by which the component parts of the stud are anchored to the other flap.

Fig. 9 represents a perspective view of the stud member.

Fig. 10 represents a perspective view of the plate or washer to which the stud member is affixed.

Fig. 11 represents a perspective view of a spring for holding the latch member normally in latching position.

The same reference characters indicate the same parts wherever they occur.

Referring first to Figs. 1 and 2, the two flaps or other elements of sheet material that are to be detachably connected by the stud and socket fastener are indicated respectively at 15 and 16. The socket member, which comprises a plurality of component parts, is permanently attached to the element 15, and the stud member, which also comprises a plurality of component parts, is permanently attached to the element 16.

The socket member comprises a crown member 17 (Fig. 5) and two plates or washers 18 and 19 (Figs. 6 and 7). In the present instance the crown member is circular and has a cylindric annular flange portion 20 and tongues 21 formed integrally therewith. This member may be made of ductile sheet metal, and may be drawn to the form shown. An opening 22 is formed in the cylindric wall 20 to receive the finger piece of the latch member hereinafter described. The plates or washers 18 and 19 are arranged against opposite faces of the element 15, to bind and clamp the marginal portion that defines the hole through which the stud member is to be inserted. The plate 18 is provided with a central hole 23 and plate 19 is provided with a central hole 24, both of which holes are of the necessary size to enable the stud member to pass through them. When the several elements of the socket member are ready to be assembled the tongues 21 of the crown member are passed through holes 25 in plate 18, through the stock of the element 15, through holes 26 in plate 19, and then bent over and clenched as shown by Figs. 1 and 2. Prior however to passing the tongues 21 through the holes, as just described, the latch member is arranged in the crown member.

The latch member is shown separately by Fig. 4. It may be made of a plate 27 of ductile sheet metal, and is provided with a hole 28 to receive the stud member. A finger piece or head 29 is formed at the outer edge of said plate, and is of such shape and size as to fit the opening 22 in the crown member. The plate is provided with an ear 30 diametrically opposite the finger piece 29, said ear being bent up substantially at right angles to the plane of the body of the plate. The function of the ear 30 is to engage a spring whereby the latch member is held normally in latching position as shown by Fig. 1. The latching portion of plate 27 is indicated at 31 in Figs. 1 and 2, and the lower edge thereof is preferably beveled as shown, to facilitate the introduction of the stud member so that the latch member will be readily displaced by the wedging action of the stud member.

Any suitable spring may be provided for holding the latch member normally in latching position, but I prefer to use a spring substantially like that shown in Fig. 11. This spring is made from a piece of spring wire, the middle portion 32 of which is adapted to rest upon plate 18. Portions 33, 33 extend at right angles to portion 32 and are adapted to bear against the cylindric wall 20 of the crown member. The end portions 34, 34 extend toward each other and toward the middle portion 32, but they are normally displaced from the general plane of the spring so that their extremities only will engage the ear 30 when the latching device is in latching position. The angular shape of the spring is such that the latter will conform substantially to the space provided for its reception, and will not become dislodged from operative position. When the latch member is displaced from latching position the end portions 34 of the spring yield, and at the same time the intermediate portions 33 yield by torsional action to the stress of the portions 34. The aggregate distortion of the spring is thus divided between the portions 34 and 33, the former undergoing flexure and the latter undergoing torsional distortion.

The stud member is shown separately by Fig. 9. It may be made from a piece of ductile sheet metal, and is drawn to provide a substantially cylindric body portion 5, a tapering head 36, and a reduced neck 37. The head and neck portions are defined one from another by a shoulder 38, the latter being adapted to overlap and coact with the latching portion 31 to lock the stud member in the socket member. The base end of the stud member is provided with tongues 39 that are adapted to extend through holes 40 formed in a plate or washer 41. Before attaching the stud member to plate 41 the ejector is arranged in the stud member. The ejector comprises a plunger 42 and a helical compression spring 43. The plunger is provided with a head 44 at one end, said head being arranged in the body portion 35 of the stud member, and the shank portion of the plunger being arranged to protrude from the head 36 through a hole 45 formed in the latter. The reduced neck 37 is of a smaller diameter than the head 44 and such head and neck form stops to limit the movement of the plunger under the stress of the spring. After the plunger and spring have been arranged in the stud member the tongues 39 of the latter may be inserted through holes 40 of the plate 41 and then wedged or headed as indicated at 46, to provide a permanent fastening. The axial measurement of spring 43, when the latter is distended to its normal condition, is greater than the distance between the head 44 and plate 41, and it is therefore necessary to compress the spring to some extent in order to attach the plate. The plunger 42 is thus normally held in the position shown by Fig. 2 with the head 44 in contact with the neck portion 37. The spring 43 is capable of being further compressed to enable the plunger to recede in the stud portion as shown by Fig. 1.

When the stud member and plate 41 have been assembled as explained in the preceding paragraph the stud member is inserted through a suitable hole in the element 16, and a plate 47 (Fig. 8) is then slipped over the stud portion. Plate 47 is provided with a central hole 48 of the necessary size to receive the stud member. Tongues 49 formed on the outer edge of the plate 47 are adapted to be passed through the element 16, and through holes 50 formed in plate 41. The stud member is permanently fastened to element 16 by bending over the ends of tongues 49 as shown by Figs. 1 and 2.

To use the device it is necessary merely to insert the stud member into the socket member far enough to carry the shoulder 38 of the stud member beyond the latching portion 31 of the latch member. As the head of the stud member advances into the socket member it engages the latching portion to exert a wedging action on the latter to displace the latch member laterally against the stress of the latching spring. In order to facilitate such wedging action of the stud member I provide plate 18 with an ear 51, and arrange said ear diametrically opposite the latching portion 31. This ear provides a bearing surface for the head of the stud member, upon which surface the head may slide while displacing the latch member. The ear 51 sustains the stress of the latching spring, and prevents the stud member from being skewed relatively to the socket member. It also insures latching coaction of the shoulder 38 and the latching portion 31 by maintaining the stud member centralized relatively to the socket member. When, in the course of inserting the stud member, the shoulder 38 has passed beyond the latching portion 31, the latch member is permitted to return to its normal position, as shown by Fig. 1, under the stress of the latching spring.

The depth of the crown member 17 and the length of plunger 42 are such that the leading end of the plunger abuts against the crown 17 before the stud member reaches latching position. It is therefore necessary for the shoulder to recede into the stud member and to compress spring 43 as shown by Fig. 1. When it is desired to detach the stud member and the socket member one from the other it is necessary merely to press the finger piece 29 in the direction indicated by the arrow in Fig. 1. The latch member may thus be moved to the position represented by Fig. 2, thus carrying the latching portion 31 from under shoulder 38. The stud member is thus released, and immediately the spring 43 distends itself. Inasmuch as the plunger 42 is already against the crown 17 the effect of the spring is to separate the stud member and socket member, one from the other. The action of the spring 43 is sufficiently forcible to eject the stud member or the socket member, as the case may be, to a considerable distance. The operation of detaching the elements 15 and 16 is thus facilitated and made substantially instantaneous.

The base portion 27 of the latch member is provided with a notch 52 to receive the ear 51. The confronting edges of said notch are adapted to slide upon opposite edges of said ear when the latch member is moved. The ear is thus utilized to guide the latch member in a straight line, the guiding being assisted by the confronting edges of opening 22 conjointly with the finger piece 29. The latch member is thus prevented from being skewed in a way that would cause the finger piece to bend on the confronting edges of opening 22.

I claim:

1. A stud-and-socket fastener comprising a socket member having a crown and a latching device in the latter, and a stud member having a latching shoulder arranged to coact with said latching device, said stud member having a central spring-plunger normally protruding from the leading end of said stud member and arranged to be repressed by said crown, whereby said plunger is adapted to eject the stud member from the socket member when said latching device is moved to unlatch said members.

2. A stud-and-socket fastener comprising a socket member having a crown and a latching device, and a stud member arranged to be engaged by said latching device, said stud member being hollow and having a longitudinal spring plunger therein which normally protrudes beyond the leading end of the stud member so as to be engaged and repressed by the crown when the stud is engaged by the latching device, said spring plunger and stud having stops for limiting the outward movement of the plunger.

3. A stud-and-socket fastener comprising a stud member having a latching shoulder, and a socket member having a crown and having a latching device arranged to coact with said latching shoulder, said crown having an opening in one side, said latching device having a finger-piece arranged to protrude through said opening for manipulation, said socket member having an ear and said latching device having confronting portions arranged to slide on said ear, to guide the movement of said latching device, said ear being arranged to engage the stud member to guide the endwise movement of the latter and to hold the stud member in potential latching position.

In testimony whereof I have affixed my signature.

ANDREW RAICHE.